Dec. 9, 1969    R. L. CROSSMAN    3,482,471
SYNTHETIC GEAR RATIO

Filed June 5, 1968    3 Sheets-Sheet 1

INVENTOR.
RICHARD L. CROSSMAN
BY
Baldwin, Egan, Walling & Fetzer
ATTORNEYS

INVENTOR.
RICHARD L. CROSSMAN
BY
Baldwin, Egan, Walling & Fetzer
ATTORNEYS.

INVENTOR.
RICHARD L. CROSSMAN
BY
Baldwin, Egan, Walling & Fetzer
ATTORNEYS.

United States Patent Office 3,482,471
Patented Dec. 9, 1969

3,482,471
SYNTHETIC GEAR RATIO
Richard L. Crossman, 386 Mark Drive,
Tallmadge, Ohio 44278
Filed June 5, 1968, Ser. No. 734,649
Int. Cl. F16h 3/44, 57/10
U.S. Cl. 74—786          5 Claims

ABSTRACT OF THE DISCLOSURE

An automotive type drive is shown including a propeller or drive shaft which is alternatively connectible to cause either of two bevel gears to drive a cross shaft either in a forward or reverse direction. The wheel drive is from the cross shaft through a planetary system comprising a sun gear driven by the cross shaft, planet gears on a planet carrier which is connectible to the shaft leading to the drive wheel and a ring gear. A novel hydraulic pump means is provided between the ring gear and an idler pinion whereby oil in the gear teeth has no place to go but over the ends of the teeth. At this point, a floating piston is provided movable toward and away from the ends of the teeth so as to provide greater or lesser restriction of the flow of the oil over the ends of the teeth thus exerting a brake on the ring gear. The amount of restriction by this floating piston controls the gear ratio and torque multiplication of this device in either direction of rotation. The position of the floating piston is controlled by hydraulic fluid driven by a pump operating off the input drive shaft for automatic drive but which can be manually controlled for a manual drive unit. The pressure in this hydraulic control system for the floating pistons is regulated by a by-pass leading back into the sump and controlled by a gear ratio, manually controlled, control valve pin which meters the excess flow back into the sump. A differential pressure flow line is provided opposite the floating pistons on opposite sides of the vehicle allowing one wheel to move faster than the other and, if desired, limiting the differential gear ratio between the wheels, by limiting the flow, to prevent excessive spinning of one wheel.

FIELD OF THE INVENTION

This invention relates to a planetary gearing which has a continuously variable speed output due to the orbit of the ring gear braked by a fluid clutch.

Description of the prior art

In Patent No. 2,025,513, granted Dec. 24, 1935 to Edward A. Johnston, a pair of opposed drive wheels are driven each by its own planetary system and hydraulic fluid applied to vane pumps, one for each planetary gearing, selectively locks or releases one set of planetary gearing whereby to provide short-turn steering movements of the vehicle. This device does not have the smoothly varied action of the present invention.

Patent No. 2,281,384, granted Apr. 28, 1942 to Edward T. Ross shows a variable speed driving means including planetary gearing having a sun gear fixed to the driving shaft, a ring gear rotatable about the driving shaft, and planetary gears whose carrier is connected to the driven shaft. The speed is controlled by applying a brake to the ring gear. This device would drive in one direction only and could only be reversed by utilizing a separately manufactured unit.

SPECIFICATION

This invention has for its object the provision of a simple drive for two opposed wheels so that an infinite range of gear ratios and torque multiplications are provided with an extremely smooth variation from one ratio to another and with an automatic change in gear ratio when the vehicle encounters hard going, such as progressing up a hill.

Other objects and advantages of this invention will be apparent from the accompanying drawings and description and the essential features will be set forth in the appended claims.

In the drawings:

FIG. 4 is a sectional view taken along the line 4—4 of FIG. 1; while

Figure 1:
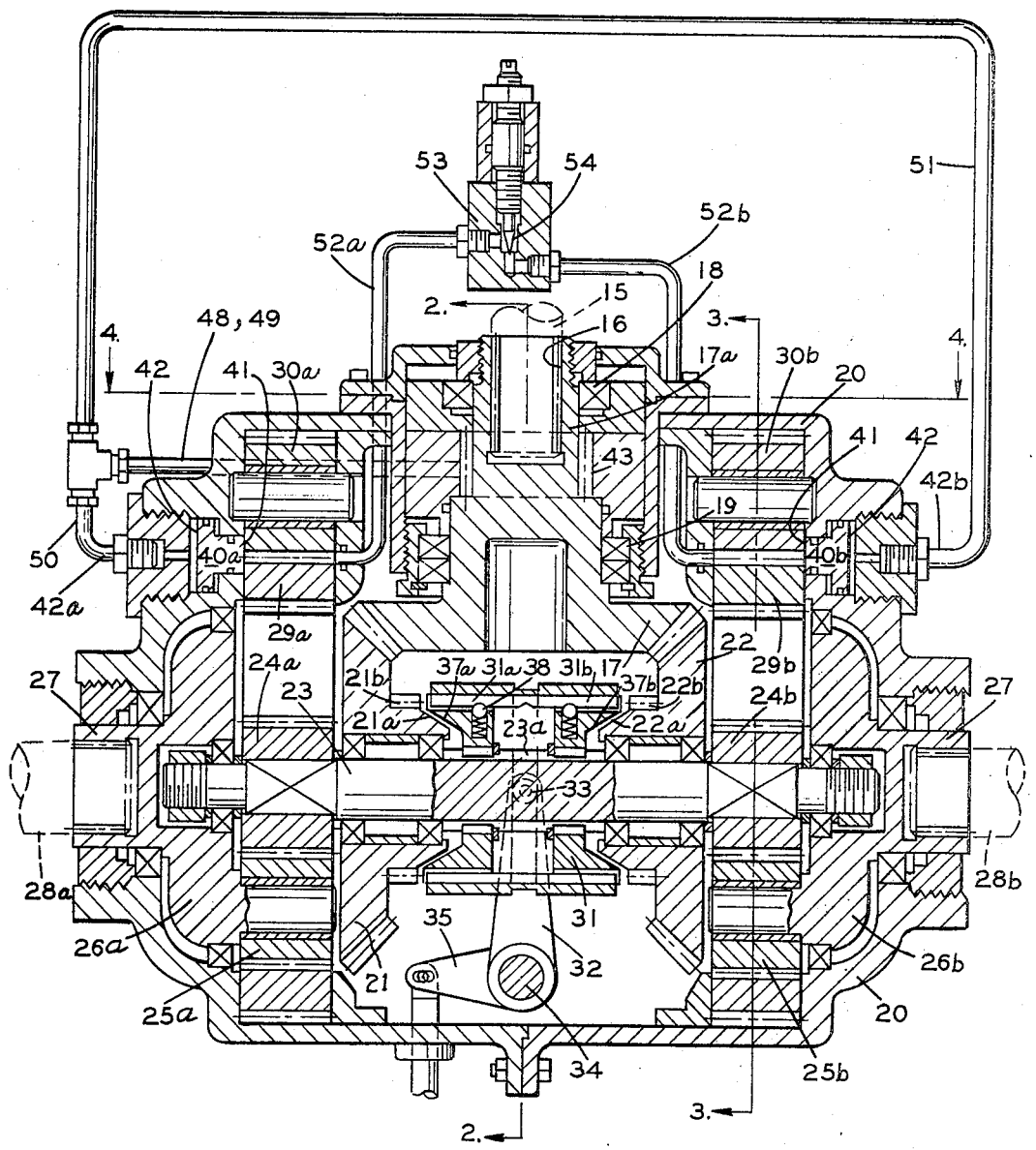
FIG. 1 is a central sectional view through a novel drive embodying this invention.

The input drive shaft 15 is drivingly connected by an internal spline 16 with the hub 17a of a bevel drive gear 17 suitably journaled at 18 and 19 in parts of the housing 20. This housing is formed in two parts as will be readily apparent in FIG. 4 but will be here described as though it were an integral entity. The bevel gear 17 meshes with a forward drive bevel gear 21 and with a reverse drive bevel gear 22. Each of these gears is journaled on a cross shaft 23 which rotatably drives a sun gear 24a at the left-hand end as seen in FIG. 1 and a similar sun gear 24b at the right-hand end. Each sun gear meshes with a plurality of planet gears 25a or 25b, five being shown in FIG. 3. These planet gears are rotatably mounted on shafts which are part of a planet carrier 26a or 26b. The hub 27 of each of these carriers has an internal spline to receive a connected driven axle 28a or 28b to drive, for instance, wheels on the opposite side of a vehicle. Each planetary system comprises a ring gear 29a or 29b having internal teeth which mesh with their respective planet gears as is usual. Each ring gear also has a set of external teeth adapted to mesh with one or more clutch pump idler pinion 30a or 30b rotatably mounted in the housing 20 as clearly seen in FIG. 3 in a position of tangency between the ring gear 29b and the idler pump pinion 30b. A single pinion 30a or 30b would be satisfactory but using two of these with each ring gear reduces the operating pressures required by one-half and at the same time reduces the likelihood of malfunction by one-half.

Figure 2:
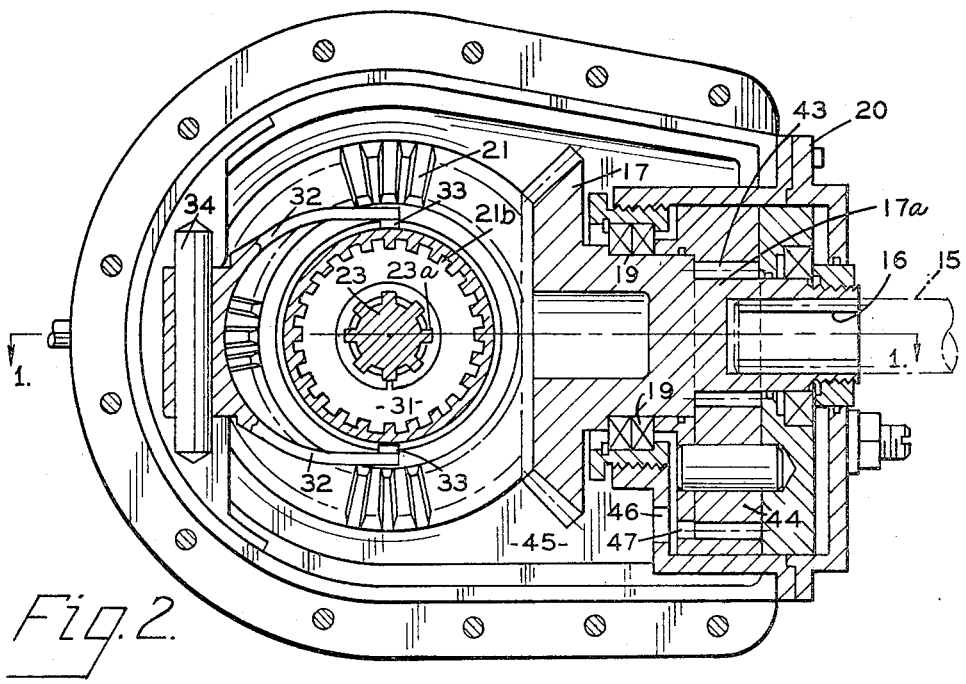
FIGS. 2 and 3 are sectional views of the same taken along the similarly numbered lines of FIG. 1, with the position of FIG. 1 indicated in FIG. 2.

Means is provided to selectively choose either the forward bevel drive gear 21 or the rearward bevel drive gear 22. This comprises a clutch structure shown centrally of the cross shaft 23. As best seen in FIGS. 1 and 2, a synchronizer collar 31 has internal splines adapted to slide longitudinally and mesh with external splines 23a on shaft 23. This movement is controlled by a bifurcated yoke 32 having a trunnion connection 33 with the collar 31 and oscillatable about a supporting shaft 34 by means of a crank 35 and an operating arm 36. The bevel gears 21 and 22 are freely rotatable on the shaft 23. When it is desired to drivingly connect one of these gears with cross shaft 23, collar 31 is moved, say, to the left as seen in FIG. 1 causing a female conical recess 37a to engage a male complementary conical projection 21a on the bevel gear 21 so as to cause collar 31 and bevel gear 21 to rotate at the same speed. Further motion of collar 31 toward the left in FIG. 1 will cause teeth 31a on the collar to engage teeth 21b on the gear so that bevel gear 21 is then drivingly connected to cross shaft 23. Movement of the collar 31 toward the right in FIG. 1 will first cause engagement between the cone surfaces 37b and 22a after which teeth 31b and 22b will be engaged. Either of the shifted positions of collar 31 is maintained by detents 38.

Figure 3:
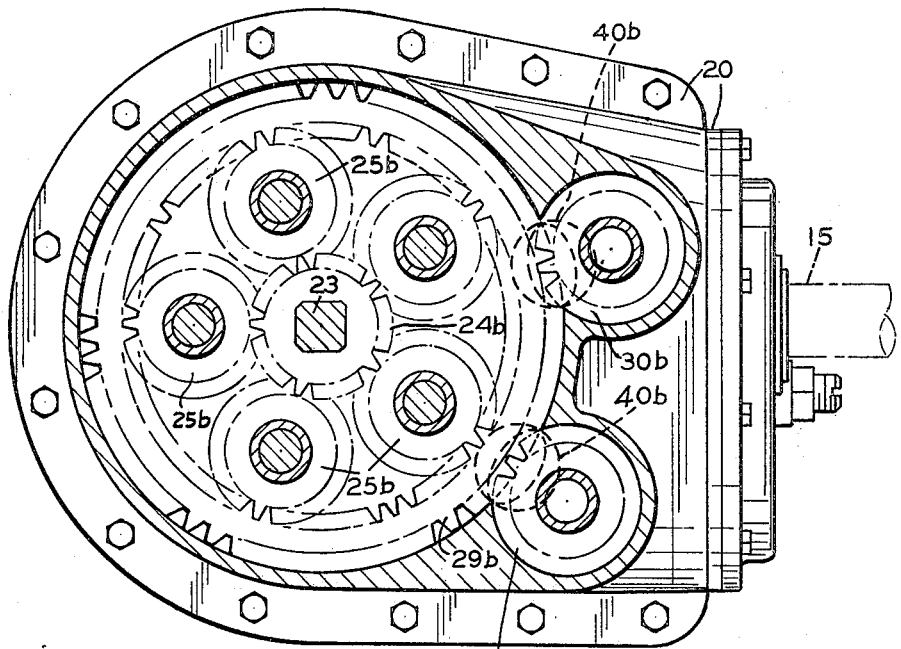

This invention utilizes the oil pump formed at 29a–30a and 29b–30b to provide an infinitely variable brake in either direction to the ring gear of each planetary system, thereby controlling the gear ratio and torque multiplication. It should be understood that the interior of the housing 20 is substantially filled with a fairly heavy oil and this is carried around by the ring gear and caught between the teeth on the outer priphery of the ring gear and the teeth of the idler gears 30a and 30b forming what I will call a clutch pump there. At each of these points of tangency where these clutch pumps are formed, a floating piston 40a or 40b is provided each having an inside or throttling face 41 and an opposed or outside face 42. Preferably the inner or smaller diameter portion of each piston 40a or 40b is of generally elliptical form as shown in FIG. 3 in broken line. This enables the floating piston to approach the meshing teeth with a throttling action and in position to cover several teeth simultaneously. It will be understood that these clutch pumps as formed at 29a–30a have neither inlet nor outlet, and the oil in the gear teeth has no place to go but over the ends of the teeth. If the floating piston is far enough away, then the flow of oil over the ends of the teeth is relatively easy and practically no braking effect is applied to the associated ring gear. However, as the throttling face 41 comes closer and closer to the point of tangency of the meshing teeth in these clutch pumps, the oil is more and more constricted until with the floating piston in the position shown in FIG. 1, there is no opportunity for the oil to flow and the associated ring gear is held practically stationary.

Figure 4:
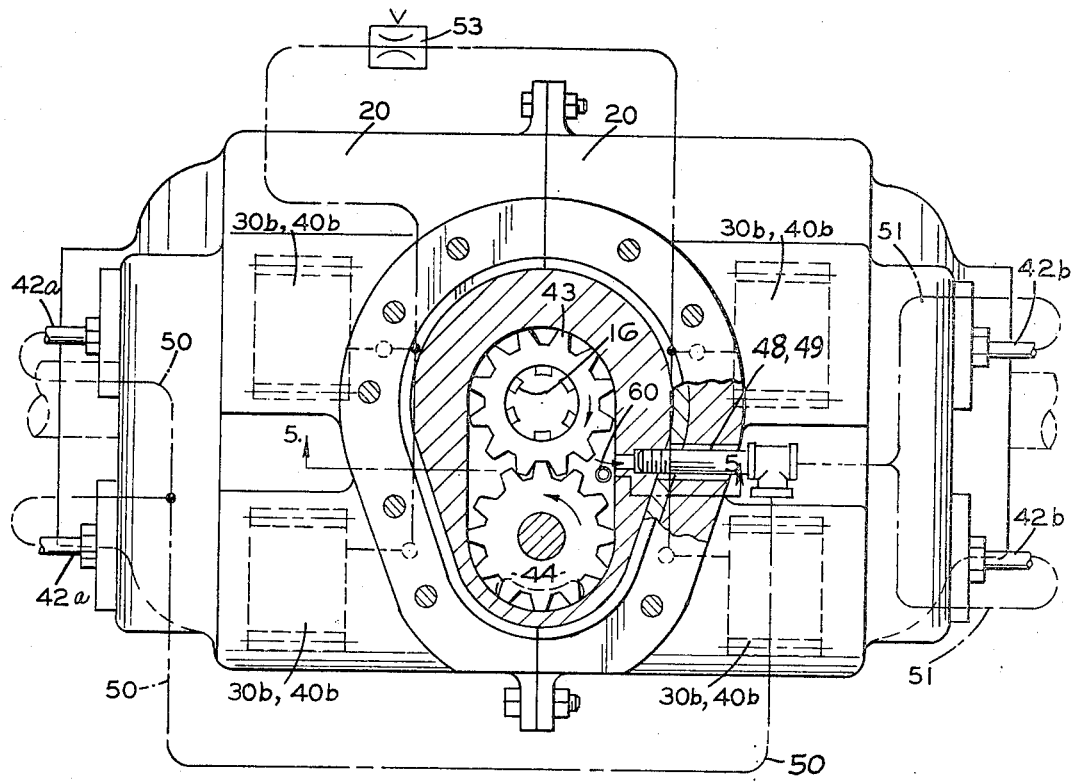

The position of each of the floating pistons 40a and 40b is controlled manually or, as shown, hydraulically from a source of hydraulic pressure fluid. A preferred system is to have a hydraulic pump operated from the input drive shaft 15. As best shown in FIGS. 1, 2 and 4, the hub 17a carries gear teeth 43 which mesh with an idler pinion 44 rotatably mounted in the housing 20. This forms a gear pump there which has an oil inlet from the sump 45 to the openings 46 and 47 shown in FIG. 2. The outlet from this pump is through parallel lines 48 and 49 shown in FIG. 4, one of which connects through conduit connections 50 with inlets 42a to the chamber supplying pressure to the outer faces of floating piston 40a, while the other communicates through lines 51 to inlets 42b supplying pressure behind the outer faces 42 of floating piston 40b on the other side of the devices. These are shown as piping, for clarity, but may be drilled passages in a production unit.

Figure 5:
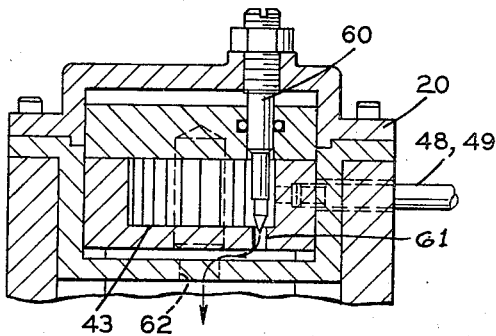
FIG. 5 is a fragmental sectional view taken along the line 5—5 of FIG. 4.

Referring to FIG. 5, the pressure exerted against the outer faces 42 of the floating pistons 42a and 40b is controlled by a needle valve 60 which, as shown in FIG. 4, is on the pressure side of the gear pump 43, 44. This needle valve controls an outlet portion 61 which communicates with another port 62 leading back into the sump 45. It is obvious that control of this by-pass 61, 62 will regulate the amount of pressure exerted in lines 48 and 51 on the one hand and 49 and 50 on the other. Valve 60 and/or the floating pistons may be controlled manually, or otherwise.

Means is provided for normal differential action between the wheels driven by axles 28a and 28b and including a provision to prevent excessive spinning of one wheel relative to the other. This is accomplished by means of pipes 52a connected to the point of tangency of the teeth or ring gear 29a and clutch pinion 30a at the left-hand side of FIG. 1 and by corresponding pipes 52b which lead from the point of tangency of the ring gear 29b and the clutch pinion 30b on the opposite side of the device. These two pipes normally communicate through the valve body 53 seen in FIG. 1. Thus, if one of the wheels drives shaft 28a faster than shaft 28b, then there will be greater pressure in the pipes 52a and this will be transmitted and equalized through the valve body 53 to the pipes 52b. By controlling the freedom of flow through the valve body 53, as by the needle valve 54, then the rate of flow between pipes 52a on the one hand and 52b on the other is limited. It results from such a construction that if the wheel connected to shaft 28a starts to spin, if the fluid pressure cannot get quickly out of the pipes 52a over to the pipes 52b, on account of the setting valve 54, then the speed of the wheel connected to shaft 28a is limited because of the pressure built up between the ring gear 28a and the clutch pinion 30a. This prevents excessive spinning of one wheel relative to the other by nearly equalizing the gear ratio for each side.

The operation of this invention should now be clearly understood. Assuming the parts are in the position of FIG. 1 and that the drive shaft 15 is rotating, the machine is stationary because neither bevel gear 21 or 22 has been clutched to the cross shaft 23. The operator then moves the rod 36 to oscillate the bifurcated yoke 32 about pin 34 either toward the forward drive bevel gear 21 or the rearward drive bevel gear 22. Assuming the forward drive is selected, the mating cone surfaces 21a and 37a will first engage to cause synchronization of the shifting collar 31 and bevel gear 21. The collar 31 will then be moved to engage teeth 31a with teeth 21b and the car will start to move forward as soon as the ring gears 29a and 29b pick up oil in the sump to pressurize the same against the clutch pinions 30a and 30b respectively and assuming that the pressure pump comprising gears 43 and 44 has supplied sufficient pressure against the outer faces 42 of the floating pistons 40a and 40b to move them slightly inwardly to cause the throttling faces 41 to cause some resistance to the flow of oil around the ends of the teeth engaged at 29a, 30a and at 29b, 30b. As the engine has speeded up, the shaft 15 will travel at a faster rate so as to build up greater pressure at the pump 43, 44. This will cause the floating pistons 40a and 40b to more nearly approach the point of tangency between the ring gear and the associated clutch pinions 30a and 30b. This pickup of speed will be very gradual and when the floating pistons have moved sufficiently to substantially engage the throttling faces 41 with the points of tangency of the associated ring gears and clutch pinions, the vehicle will be in high gear which in one embodiment was at a gear ratio of about three to one. If the car should start up a hill, then the load on the drive wheels will slow down the movement of the wheel axles 28a and 28b thus building up greater pressure at the clutch pumps 29a, and 30a and 29b, 30b. This will back off the floating pistons 40a and 40b which will allow the ring gears 29a and 29b to move more freely which increases the gear ratio. The propeller shaft 15 will then speed up to build up the pressure in the clutch tubes 50 and 51 which will push the floating pistons 40a and 40b inwardly toward the associated ring gears by the greater pressure on the outer faces 42 of the floating pistons. All of this adjustment takes place in a fraction of a second and the movement of the floating pistons 40a and 40b is of the order of 80 to 100 thousandths of an inch for the full range of gear ratio provided by this invention. Operations to drive the vehicle in a rearward direction are like those just described except that the shifting yoke 32 is moved to clutch the rearward drive bevel gear 22 to the cross shaft 23.

The invention thus provides a simple drive of infinite gear ratio variation all of which is accomplished very smoothly and automatically and with all of the gears continuously running in oil.

What is claimed is:

1. A variable gear ratio drive mechanism comprising a housing, an input power shaft extending into said housing, a main bevel gear in said housing mounted on and rotatable with said power shaft, a cross shaft rotatably mounted in said housing spaced from said main bevel gear and at right angles to said input shaft, opposed forward and reverse drive bevel gears rotatably mounted on said cross shaft in said housing each in position to mesh with said main bevel gear, means for selectively controlling the drive between said cross shaft and said forward and reverse bevel gears respectively, two sun gears one at each end of said cross shaft and rotatable therewith, a planet carrier for each sun gear having a cluster of planet gears rotatably mounted thereon and meshing with the associated sun gear, each said carrier having a hub rotatably mounted in said housing concentric with said cross shaft, each said hub having means for connecting a driven axle, a ring gear meshing with each cluster of planet gears and rotatably mounted in said housing, an idler clutch pinion having teeth meshing with each said ring gear and rotatably mounted in said housing and forming a clutch pump at the point of tangency between each ring gear and its associated clutch pinion, means providing a substantially liquid-tight housing at each said point of tangency save for a communicating chamber extending axially in line with said meshing teeth, a piston reciprocatable in each said chamber adapted to move a throttling face thereof toward and away from said meshing teeth, means providing an oil supply continuously to each said ring gear, means providing a source of pressure fluid or other control, conduit means communicating between said source and the face of each said piston opposite its throttling face, and variable means for controlling said pistons to variably throttle said clutch pumps to varyingly brake rotation of each said ring gear in either direction, thereby controlling precession of each said planet carrier and rotation of associated axles in either direction as selected.

2. A variable gear ratio drive mechanism as set forth in claim 1, wherein said source of pressure fluid is a pump drivingly connected with said input shaft.

3. A variable gear ratio drive mechanism as set forth in claim 1 wherein said source of pressure fluid is an hydraulic gear pump inside said housing comprising a pinion on said input shaft meshing with an idler pinion rotatably mounted in said housing, said housing enclosing said hydraulic gear pump save for an inlet communicating with an oil reservoir in said housing and an outlet to said conduit means, and said last named means including a valve controlled by-pass leading from said conduit means back to said oil reservoir.

4. A variable gear ratio drive mechanism as defined in claim 1, including a differential pressure tube providing communication between said clutch pumps, and adjustable means for controlling flow through said differential pressure tube.

5. A variable gear ratio drive mechanism as defined in claim 1, wherein said means for selectively controlling the drive between said cross shaft and said forward and reverse bevel gears comprises mounting said forward and reverse bevel gears for free rotation on said cross shaft and simultaneously in mesh with said main bevel gear, and providing a clutch collar on said cross shaft between said forward and reverse bevel gears and having a splined connection therewith and movable longitudinally thereof selectively into driving engagement with either one of said forward and reverse bevel gears.

References Cited

UNITED STATES PATENTS

| | | | |
|---|---|---|---|
| 2,025,513 | 12/1935 | Johnston | 74—720.5 |
| 2,212,046 | 8/1940 | Ross | 74—786 |
| 2,281,384 | 4/1942 | Ross | 74—786 |
| 2,340,241 | 1/1944 | Woods | 74—786 |

ARTHUR T. McKEON, Primary Examiner